F. R. WEISGERBER.
BELT ATTACHMENT FOR MOTOR VEHICLES.
APPLICATION FILED MAY 31, 1918.
1,297,948.
Patented Mar. 18, 1919.
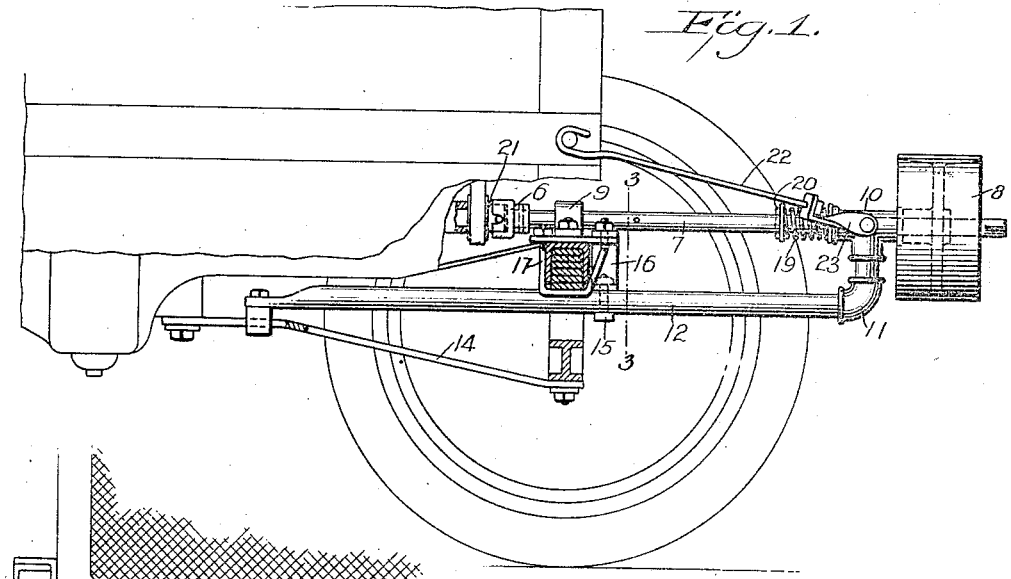
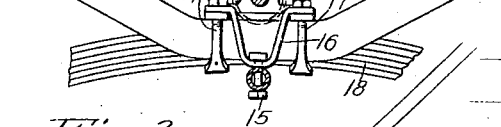
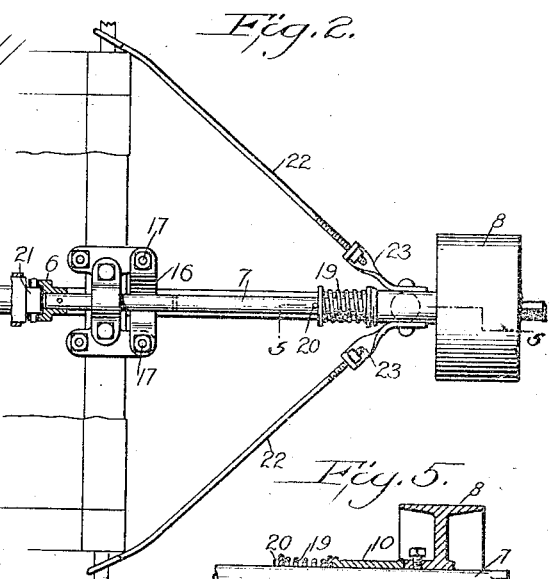
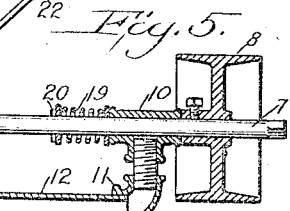
WITNESSES
Oliver W. Holmes
INVENTOR
F. R. Weisgerber
BY
ATTORNEYS

UNITED STATES PATENT OFFICE.

FRANK R. WEISGERBER, OF SALINA, KANSAS.

BELT ATTACHMENT FOR MOTOR-VEHICLES.

1,297,948.   Specification of Letters Patent.   Patented Mar. 18, 1919.

Application filed May 31, 1918.  Serial No. 237,430.

*To all whom it may concern:*

Be it known that I, FRANK R. WEISGERBER, a citizen of the United States, residing at Salina, in the county of Saline and State of Kansas, have invented a new and Improved Belt Attachment for Motor-Vehicles, of which the following is a full, clear, and exact description.

My invention relates to a belt attachment, and an object of the invention is to provide a simple, strong and inexpensive attachment which can be easily applied to a motor vehicle and which takes the place of the crank and can be used in a manner similar to the crank.

Another object of the invention is to provide a belt attachment which will not interfere with the vehicle and which will allow the use of the vehicle with the attachment thereon the same as without the attachment.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a fragmentary sectional view of a motor vehicle provided with an attachment embodying my invention;

Fig. 2 is a plan view of the attachment showing the manner of securing the same to the vehicle, certain parts of the attachment being in section to show the details of construction;

Fig. 3 is a section on line 3—3, Fig. 1;

Fig. 4 is a fragmentary side elevation similar to that in Fig. 1, showing the attachment uncoupled from the engine; and Fig. 5 is a section on line 5—5, Fig. 2.

Referring to the drawings, 6 is a coupling member which is keyed to one end of a shaft 7, which shaft also carries a pulley 8 near the other end. The shaft 7 is supported near the coupling by a bearing 9 which is the bearing of the crank of the automobile. The shaft is also supported by a bearing 10 near the pulley which is formed of a T properly babbitted in the shoulders. The T is in turn connected by an elbow 11 to a tube 12 which extends parallel to the shaft.

The free end of the tube is flattened so that the same can be bolted to the brace 13 of the radius rods 14 of the automobile. The tube 12 is also connected by a bolt 15 to a bracket 16 which is bolted to the yokes 17 of the spring 18. This connection of the tube 12 at the spring suspension causes the bearing 10 to participate in all the movements of the bearing 9 which is carried by the spring suspension; therefore, the shaft 7 has two bearings which will maintain the shaft in proper alinement.

The shaft 7 carries a spring 19 which can be maintained against the bearing 10 by a pin 20 detachable from the shaft, so that the spring will normally tend to maintain the coupling member 6 in engagement with the driving end 21 of the engine shaft. In consequence the rotation of the engine shaft will be transmitted to the shaft 7 and, therefore, to the pulley 8 from which power can then be derived.

To increase the stability of the bearing 10 and prevent side sway of same, I provide tension rods 22 which are hooked on to the body of the automobile. The ends of the rod are threaded to engage ears 23 pivotally connected to the T forming the bearing. It will be noted that the rods not only prevent lateral movement of the shaft but also downward displacement of same relative to the vehicle frame.

To disengage the shaft 7 from the engine shaft, the pin 20 is pulled out; the spring 19 is then moved against the bearing 9 and the pin inserted into the shaft in a suitable opening provided for the pin, as best shown in Fig. 4. The spring acting against the pin will necessarily move the shaft 7 and disengage the coupling member from the engine shaft, as shown in Fig. 4. To facilitate cranking with the device, one end of the shaft 7 near the pulley 8 is shaped to receive the crank; and by pushing against the resistance of the spring 19 the coupling member 6 can be brought into engagement with the proximate end of the engine shaft so that the engine can be cranked in the common way. When the pressure on the end of the shaft 7 is released the spring 19 will disengage the same from the engine shaft after the engine has been started.

From the above it will be seen that the automobile can be used in the common way with the attachment on. On the other hand, if desired, the attachment can be easily removed by any one, though not skilled in this kind of work.

I claim:

1. A belt attachment for motor vehicles comprising a frame adapted to be secured to the vehicle so that a part of said frame will extend forward of the vehicle, a shaft revolubly and slidably mounted on said frame, a coupling member constrained to move with the shaft for coupling the shaft to the crank shaft of the vehicle, a spring movable on said shaft, means for positioning said spring on the shaft so that it will either maintain the coupling member in engagement with the crank shaft or maintain the coupling member disengaged from the crank shaft, and a pulley constrained to move with said shaft.

2. A belt attachment for motor vehicles comprising a frame adapted to be secured to the underside of the vehicle so that a portion of said frame will extend forward of the vehicle, a shaft mounted to revolve and slide in said frame, a coupling member constrained to move with said shaft in different positions on said shaft and whereby said shaft may be coupled to the crank shaft of the vehicle, a movable spring on said shaft, means for connecting said spring to the shaft so that the shaft may be moved on the frame to or from the crank shaft whereby the coupling member may be maintained in or out of engagement with the crank shaft, and a pulley constrained to move with said shaft, said shaft having means for receiving a crank substantially as and for the purpose set forth.

3. A belt attachment for motor vehicles comprising a tube, means for securing the tube to the front part of the vehicle so that the same will extend forward of the vehicle, a second bearing, a shaft mounted to revolve and slide in said bearings, a spring movable on the shaft and adapted to engage either of the bearings, means for engaging the spring and shaft for maintaining said spring in stressed position against either of the bearings, a coupling member associated with the end of the shaft in proximity of the crank shaft of the vehicle, and a pulley associated with one end of the shaft.

4. A belt attachment for motor vehicles comprising a tube, means for securing said tube to the spring suspension of the vehicle so that a part of said tube extends forwardly of the vehicle, a T secured to said tube so that the shoulders of the T aline with the crank shaft of the vehicle, a bearing, a shaft bearing in said bearing and the shoulder of the T, a spring movable on the shaft and adapted to be located at the T or bearing, means for retaining said spring in stressed condition either at the T or at the bearing, a coupling member carried by the shaft in proximity of the crank shaft of the vehicle, a pulley constrained to move with the shaft, and tie rods connecting the T to the vehicle so as to prevent lateral movement of said T.

5. A belt attachment for motor vehicles comprising a tube, means for securing one end of the tube to the radius rods of the vehicle, a bracket adapted to be secured to the spring suspension of the vehicle, means for securing the tube to the bracket, a T secured to the front end of the tube so that the same alines with the crank shaft of the vehicle, a bearing secured to the spring suspension of the vehicle to aline with the shoulders of the T, a shaft mounted to slide and revolve in said T and bearing, a spring movable on said shaft between the T and bearing, means for engaging the spring and shaft whereby said spring may be maintained in stressed position on said shaft against either the T or the bearing so as to move the shaft to or from the crank shaft of the vehicle, a coupling member secured to the shaft in proximity of the crank shaft, a pulley secured to the shaft in proximity of the T, and tie rods securing the T to the vehicle above the suspension to prevent lateral movement of said T, said shaft having its forward end so arranged that a crank can be secured thereto substantially as and for the purpose set forth.

FRANK R. WEISGERBER.